Patented July 5, 1927.

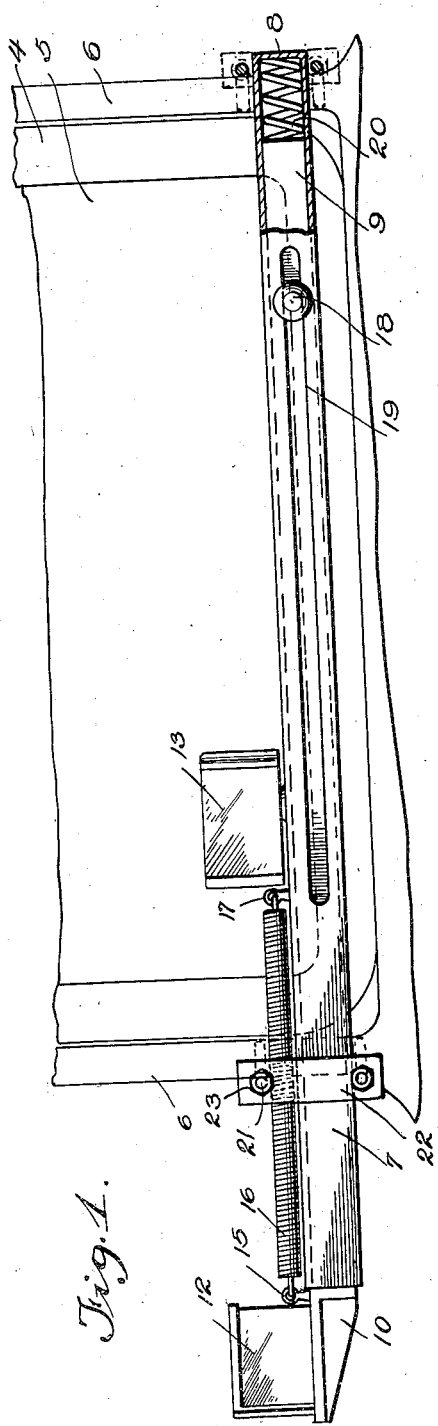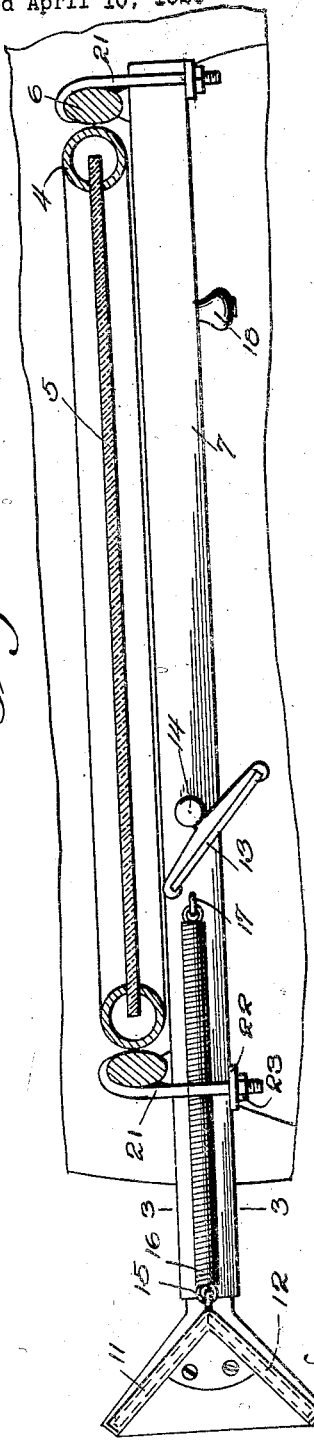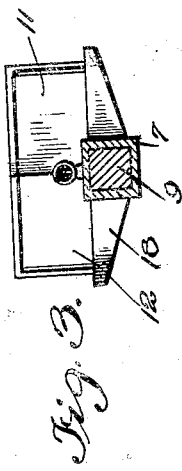

1,634,383

UNITED STATES PATENT OFFICE.

JOHN J. OBRIEN, OF PALM BEACH, FLORIDA.

ADJUSTABLE MIRROR.

Application filed April 10, 1926. Serial No. 101,082.

The present invention relates to improvements in adjustable mirrors for automobiles and has for an object to provide an adjustable mirror construction capable of installation conveniently upon the windshield frame or other existing parts of the vehicle construction, and in which a view may be had from the driver's seat both in front and behind the vehicle.

Another object of the invention lies in providing a mirror construction which may be projected for a considerable distance outwardly of the side of the vehicle, whereby to give a long range view particularly desirable when traveling in close formation in a long line of vehicles.

A still further object of the invention lies in providing a compact, inexpensive and attractive construction which may be purchased as an accessory at small cost and which will be constructed with a view to ease in operation, and which will demand but a minimum of attention from the operator thereby avoiding taking his time and attention from the necessary controls of the vehicle.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is an elevation of the windshield and fragments of the vehicle construction from the driver's seat showing the improved adjustable mirror construction partly in section.

Figure 2 is a horizontal section taken through the windshield construction just above the mirror and its supporting parts, and Figure 3 is a cross section taken on the line 3—3 in Figure 2.

Referring more particularly to the drawings, 4 designates the windshield frame and 5 the glass of the windshield. The supporting arms for the windshield glass frame 4 are indicated at 6 and these supporting arms are utilized in the present embodiment of the invention to secure the mirror construction. This mirror construction is mounted and carried by a tube 7 closed at one end 8 and open at its other end to slidably receive the bar 9. The tube and bar are preferably square or rectangular in cross section, as indicated in Figure 3. The bar is thus prevented from rotating in the tube. The outer end of the bar carries the bracket 10 which supports the front mirror 11 and the rear mirror 12. These mirrors are arranged at an angle and converge toward the side of the vehicle. The mirrors may be held upon the bracket in any suitable manner. The mirrors are arranged to reflect objects both in front and in rear of the vehicle upon a third mirror 13, which is mounted upon the top part of the tube or casing 7 directly in front of the driver. This mirror 13 is carried by a bracket 14 which is adjustably mounted upon the casing and may swing angularly in order to bring it to a correct position to reflect the objects from the mirrors 11 and 12.

The bracket 10 is provided with the staple or eye bolt 15 to receive one end of the coil spring 16. A similar staple or eye bolt 17 upon the tube 7 receives the other end of the spring 16. In the drawings the spring is shown in normal position. The spring is distended when the bar 9 is thrust outwardly and the spring thus acts to return the bar when the pressure is released. The bar carries the handle 18 projecting through a slot 19 in the rear wall of the tube 7. The inner end of the bar 9 terminates short of the closed end 8 of the tube 7 and a cushion coil spring 20 is placed between these two parts. The slot 19 is long enough to prevent the handle or button 18 from striking against the end of the slot when the bar 9 is drawn inwardly by the coil spring 16. The slot is also long enough to permit the cushion spring 20 to be compressed by the inward movement of the bar 9.

The tube 7 thus carries all of the parts and this tube 7 is secured by suitable fastening means to the supporting arms 6 of the windshield frame. In this instance hook shaped bolts 21 are shown as engaging about the forward portions of the arms 6 which are substantially oval in cross section (see Figure 2). The rear threaded ends of the bolts 21 pass through clamp plates 22 and are provided with the nuts 23 and washers if necessary. The bolts 21 are preferably mounted in pairs one above and one below the tube 7 and the clamp plates 22 engage against the rear walls of the tube and they bind the tube tightly to the supporting arms 6. The tube 7 extends at its open end beyond the windshield frame and out-board of the vehicle body frame but the parts including the bracket 10 and the mirrors 11 and 12 preferably remain in their inner position within the plane of the running board as required by law in most localities. However, the mirrors 11 and 12 will reflect into the driver's mirror 13 the objects and the roadway in front and to the rear of the vehicle in normal inner position of the parts but, by projecting the mirror through the outward moving of the bar 9 a much better view can be obtained and a view which is not obstructed by cars immediately in front of and to the rear of the vehicle carrying the mirror construction.

When the mirror is projected outwardly to its full length a view for a great distance in both directions can be secured.

The operator need only release the handle or button 18 whereupon the coil spring 16 will quickly draw the bar and the out-board mirrors 11 and 12 inwardly. The bar will forcibly strike the cushioning spring 20 in the inner closed end of the tube 7 and this coil spring will function to absorb the shock and to bring the bar 9 to a gradual stop. The driver's mirror 13 may be shifted about angularly to any desired position and this mirror will be at a low position, so that it will not interfere with the visibility of the windshield.

It is obvious that various changes and modifications may be made in the details of construction and design of the above specifically described embodiment of this invention without departing from the spirit thereof, such changes and modifications being restricted only by the scope of the following claims.

What is claimed is:—

1. A mirror construction for vehicles comprising a driver's mirror disposed in front of the driver's seat in a diagonal position wth respect to the direction of travel of the vehicle, a double mirror, means for normally supporting the double mirror at the side of the vehicle and in line with the driver's mirror to reflect objects upon the driver's mirror from both the front and rear surfaces of the double mirror, means for projecting the double mirror outwardly beyond its normal position to broaden the field of vision through the mirrors, and retracting means for the double mirror to return the same to normal position when said projecting means is released.

2. A mirror construction for vehicles comprising a driver's mirror disposed in front of the driver's seat of the vehicle and extending diagonally with respect to the direction of travel of the vehicle, a double mirror construction suspended from the side mirror of the vehicle and laterally in line with the driver's mirror whereby to reflect objects upon said driver's mirror from both surfaces of said double mirror construction, said double mirror construction having forward and rearward mirror surfaces also disposed diagonally with respect to the path of movement of the vehicle, said front and rear mirror surfaces converging toward said driver's mirror, projectable means slidably supported from the vehicle for carrying said double mirror construction whereby the double mirror construction may be projected at desired distances laterally from the driver's mirror, means whereby the operator may shift said projectable means back and forth, and yieldable means for automatically returning said projectable means to the inner position.

3. A mirror construction for vehicles comprising a driver's mirror disposed in front of the driver's seat of the vehicle and extending diagonally with respect to the direction of travel of the vehicle, a double mirror construction suspended from the side of the vehicle and laterally in line with the driver's mirror whereby to reflect objects upon said driver's mirror from both surfaces of said double mirror construction, said double mirror construction having forward and rearward mirror surfaces also disposed diagonally with respect to the path of movement of the vehicle, said front and rear mirror surfaces converging toward said driver's mirror, projectable means for carrying said double mirror construction whereby the double mirror construction may be shifted laterally toward and away from said driver's mirror, means for manipulating said projectable means, spring means for automatically returning said projectable means to the inner position, and cushioning means engaged by said projectable means at the inner limit of its movement.

4. A mirror construction for vehicles comprising a driver's mirror disposed in front of the driver's seat of the vehicle and extending diagonally with respect to the direction of travel of the vehicle, a double mirror construction suspended from the side of the vehicle and laterally in line with the driver's mirror whereby to reflect objects upon said driver's mirror from both surfaces of said double mirror construction, said double mirror construction having forward and rearward mirror surfaces also disposed diagonally with respect to the path of movement of the vehicle, said front and rear mirror surfaces converging toward said driver's mirror, a plunger carrying said double mirror construction, a casing for slidably and non-rotatably holding said plunger, cushioning means in said casing engaged by said plunger near the inner limit of its movement, resilient means connected to said casing and plunger for restoring the plunger to the innermost position, and means whereby said casing may be secured to the vehicle.

JOHN J. OBRIEN.